(12) United States Patent
Siegl

(10) Patent No.: US 8,772,393 B2
(45) Date of Patent: Jul. 8, 2014

(54) PLASTIC FORMULATION AND METHOD FOR THE PRODUCTION OF PLASTIC BOTTLES IN A TWO-STAGE STRETCH BLOW-MOLDING PROCESS

(71) Applicant: Alpla Werke Alwin Lehner GmbH & Co. KG, Hard (AT)

(72) Inventor: Robert Siegl, Dornbirn (AT)

(73) Assignee: Alpla Werke Alwin Lehner GmbH & Co. KG, Hard (AT)

( * ) Notice: Subject to any disclaimer, the term of this patent is extended or adjusted under 35 U.S.C. 154(b) by 0 days.

(21) Appl. No.: 14/085,193

(22) Filed: Nov. 20, 2013

(65) Prior Publication Data

US 2014/0077424 A1 Mar. 20, 2014

Related U.S. Application Data

(60) Division of application No. 13/012,243, filed on Jan. 24, 2011, now Pat. No. 8,604,116, which is a continuation of application No. PCT/EP2009/005126, filed on Jul. 15, 2009.

(30) Foreign Application Priority Data

Jul. 24, 2008 (CH) ......................... 1161/08

(51) Int. Cl.
*C08L 23/06* (2006.01)
*C08K 3/34* (2006.01)

(52) U.S. Cl.
USPC ........... 524/413; 524/587; 524/427; 524/451; 524/420

(58) Field of Classification Search
USPC .......................... 524/587, 427, 451, 420, 413
See application file for complete search history.

(56) References Cited

U.S. PATENT DOCUMENTS

| 4,770,912 A | 9/1988 | Furrer et al. |
| 5,858,491 A | 1/1999 | Geussens et al. |

FOREIGN PATENT DOCUMENTS

WO WO 96/14358 A1 5/1996

OTHER PUBLICATIONS

International Search Report (PCT/ISA/210) issued on Apr. 15, 2010, by European Patent Office as the International Searching Authority for International Application No. PCT/EP2009/005126.
Written Opinion (PCT/ISA/237) issued on Apr. 15, 2010, by European Patent Office as the International Searching Authority for International Application No. PCT/EP2009/005126.
Notification of Transmittal of Translation of the International Preliminary Report on Patentability (Forms PCT/IB/338 and PCT/IB/373) and the Written Opinion of the Searching Authority ( Form PCT/ISA/237) issued in the corresponding International Application No. PCT/EP2009/005126 dated Feb. 17, 2011.

*Primary Examiner* — Robert D. Harlan
(74) *Attorney, Agent, or Firm* — Buchanan Ingersoll & Rooney PC

(57) ABSTRACT

An exemplary plastic formulation is disclosed for the production of plastic bottles in a two-stage stretch blow-molding process, and includes at least 60% of HDPE (High Density Polyethylene) having a density of 0.941 $g/cm^3$ to 0.965 g/cm3 and according to ISO 1133 a melt index 190° C./2.16 kg of 0.1 to 0.9 g/10 min. The HDPE contains a mono-modal or multi-modal HDPE having a second melt index 190° C./21.6 kg of 5 g/10 min to 50 g/10 min according to ISO 1133. A method is disclosed for producing a plastic bottle in a two-stage stretch blow-molding process using the plastic formulation.

12 Claims, No Drawings

PLASTIC FORMULATION AND METHOD FOR THE PRODUCTION OF PLASTIC BOTTLES IN A TWO-STAGE STRETCH BLOW-MOLDING PROCESS

RELATED APPLICATIONS

This application is a divisional application of U.S. application Ser. No. 13/012,243, filed on Jan. 24, 2011 which claims priority as a continuation application under 35 U.S.C. §120 to PCT/EP2009/005126, which was filed as an International Application on Jul. 15, 2009 designating the U.S., and which claims priority to Swiss Application 1161/08 filed in Switzerland on Jul. 24, 2008. The entire contents of these applications are hereby incorporated by reference in their entireties.

FIELD

The disclosure relates to method and a plastic formulation for producing plastic bottles in a two-station stretch blow-molding

BACKGROUND INFORMATION

A large number of plastic bottles and similar plastic containers used nowadays are produced in a stretch blow-molding process. In exemplary methods, a so-called preform, which has an elongated tube-like shape on its one longitudinal end, has a bottom and on the other longitudinal end a neck region with molded threaded sections or the like, is inserted into the mold cavity of a blow mold and is inflated by a medium which has been blown in with overpressure. Here the preform is additionally stretched in the axial direction with a stretching mandrel which has been inserted through the neck opening. After the stretching/blow-molding process the finished plastic bottle is removed from the blow mold.

The single-layer or multi-layer preform is produced before the stretch blow-molding process in a separate injection molding method or in a plastic flow molding method. In the so-called single-station stretch blow-molding process the preform is inflated into a plastic container immediately after its production and stretched. But often the plastic containers are produced separately in space and time from the stretch blow-molding process in a two-station method and are temporarily stored for later use. In the later stretch blow-molding process the preforms are heated again in order to produce plastic bottles from them. In this way the two processes, injection molding and stretch blow-molding, can be performed separately and optimally. In the stretch blow-molding process the preform is brought to the specified temperature for example by infrared radiation and is stretched in the axial direction with a stretching rod during the forming process and is radially molded in the molding tool by overpressure.

The raw material for producing plastic bottles in a stretch blow-molding process is mainly polypropylene or PET (polyethylene terephthalate). Polypropylene and PET have been tested many times and their properties have been known for a long time. But due to its low stiffness polypropylene can have relatively poor top load properties. The creep properties of oriented polypropylene are also poor.

Known plastic bottles which are produced in a two-station method, due to the PET which is conventionally used and due to their wide range of application, can engender major difficulties in the recycling stream. Straight plastic containers which are used for example as milk bottles, for preparing cosmetics or for storage of detergents are to be separated in recycling since they are undesirable for direct contact with food. Due to the density of the PET, these bottles however cannot be separated in a floating-sinking process.

For technical and economic reasons it would therefore be desirable if other plastics which are matched to the specific problem, for example HDPE (high density polyethylene) could be processed in a stretch blow-molding process. HDPE also has relatively high stiffness even at low wall thicknesses.

In the injection blow-molding process and in the single-station stretch blow-molding process, the use of HDPE as the raw material which is known from the extrusion blow-molding process for producing plastic bottles is already a popular practice. In the two-station stretch blow-molding process with the high stretching ratios which are used there, HDPE has not been used to date since the poor stretch compaction of the HDPE either did not enable any bottle production at all or resulted in plastic bottles with an overly dramatically fluctuating process or a nonuniform wall thickness profile. Issues also arise fundamentally in injection blow-molding and in a single-station stretch blow-molding process with HDPE. But this can be managed by the preforms being allowed to expand only very little during inflation in order to solve issues with unstable wall thickness. The preforms used in injection blow-molding and in the single-station stretch blow-molding process therefore already have a length which differs only a little from the length of the bottles which have been produced. Accordingly the longitudinal stretching ratio is only 1 to 1.8. The diameter stretching ratio is between 1 and at most 2.2.

The material distribution in known stretch blow-molding can be influenced via the viscosity of the raw material used. But those viscous raw materials which can be easily processed in the stretch blow-molding process often have a viscosity which is too high for the injection molding process. Raw materials which are to be suitable for the two-station stretch blow-molding process should however satisfy the specifications of the injection molding process for producing the preforms and those of the stretch blow-molding process in which plastic bottles are produced from the preforms.

SUMMARY

A plastic formulation is disclosed for producing plastic bottles in a two-station stretch blow-molding process, from a plastic preform, produced from an injection molding process or a flow molding process, for a plastic bottle producible in a separate stretch blow-molding process, the preform being stretchable axially and radially, and the plastic formulation comprising: at least 60% HDPE (high density polyethylene) of a density from 0.941 $g/cm^3$ to 0.965 $g/cm^3$ and with a first melt index 190° C./2.16 kg from 0.1 to 0.9 g/10 min according to ISO 1133, the HDPE comprising a monomodal or multimodal HDPE with a second melt index 190° C./21.6 kg from 5 g/10 min to 50 g/10 min according to ISO 1133.

A method is disclosed for producing a plastic bottle in a two-station stretch blow-molding process, comprising: producing a preform from a plastic formulation in an injection molding process or in a flow molding process from a plastic formulation; and producing a plastic bottle separately from the preform in space and/or time, in a stretch blow-molding process, wherein the preform is axially and radially stretched, and wherein the plastic formulation is based on an at least bimodal HDPE containing at least 60% HDPE (high density polyethylene) of a density from 0.941 $g/cm^3$ to 0.965 $g/cm^3$ and with a first melt index 190° C./2.16 kg from 0.1 to 0.9 g/10 min according to ISO 1133, the HDPE comprising a monomodal or multimodal HDPE with a second melt index 190° C./21.6 kg from 5 g/10 min to 50 g/10 min according to ISO 1133.

DETAILED DESCRIPTION

Exemplary embodiments are directed to preparation of a plastic formulation based on HDPE which is suitable for the two-station stretch blow-molding process. The HDPE formulation will allow a frictionless injection molding process without melt rupture, and on the other hand enable sufficient stretch compaction in the stretch blow-molding process. Furthermore a two-station stretch blow-molding process is disclosed for processing of the plastic formulation.

An exemplary plastic formulation is disclosed for producing plastic bottles in a two-station stretch blow-molding process which is at least 60% based on HDPE (high density polyethylene) which has a density from 0.941 $g/cm^3$ to 0.965 $g/cm^3$ and a first melt index 190° C./2.16 kg from 0.1 to 0.9 g/10 min according to ISO 1133, the HDPE comprising a monomodal or multimodal HDPE with a second melt index 190° C./21.6 kg from 5 g/10 min to 50 g/10 min, likewise measured according to ISO 1133. Preferably the plastic formulation has a first melt index of, for example, 190° C./2.16 kg of roughly 0.3 g/10 min and a second melt index of, for example, 190° C./21.6 kg of 30 g/10 min and a bimodal distribution.

The plastic matrix which is based on bimodal or multimodal HDPE is optimized on the one hand for the injection molding process (or for a flow molding process) and on the other hand is also well suited to the stretch blow-molding process. The HDPE of chosen density can be processed largely without problems in the injection molding process. For example, in the injection molding process the viscosity of the HDPE with a low molecular weight provides for melt ruptures being prevented. The HDPE with a greater molecular weight is, for example, responsible for sufficient stretch compaction of the plastic being achieved in the stretch blow-molding process. The shrinkage values which can be achieved with the plastic formulation based on multimodal HDPE correspond largely to that of PET shortly after injection molding. This makes it possible to use injection molding molds from PET processing in the injection molding process. The analogous applies to the stretch blow-molding process, where the existing blow molds for PET processing can likewise continue to be used. Thus, switching of the raw material from PET to a plastic formulation based on HDPE does not necessarily result in tool investments.

An exemplary HDPE formulation as disclosed makes it possible to also produce plastic bottles in a two-station stretch blow-molding process and in doing so to use the advantages of HDPE, for example its high water vapor barrier relative to the PET of the plastic bottles produced from it. Plastic bottles of the HDPE formulation as disclosed herein at lower bottle weight have comparable strength values to PET bottles. Lower weight means lower raw material use and thus lower petroleum consumption and conservation of resources as well as a reduction of $CO_2$ release. This makes the use of an exemplary HDPE plastic formulation as disclosed advantageous both from the economic and also the ecological standpoint. A plastic formulation which is produced essentially (i.e., substantially) based on bimodal or multimodal HDPE has a density from 0.941 $g/cm^3$ to 0.965 $g/cm^3$. In this way the plastic bottles which have been produced from the plastic formulation can be very easily sorted out from the PET stream, for example in a floating-sinking method, by way of their density.

For economic reasons, up to 40% calcium carbonate can be added to the plastic formulation in order to reduce the specified amount of plastic.

One version of the disclosure has at least 90% HDPE by weight. For economic reasons this version of the plastic formulation also can contain up to 10% by weight calcium carbonate and/or talc and/or a mixture of polymers which are suited for the blow molding process as filler. The addition of these types of fillers allows changes in the density and the rheological properties only to occur to a very limited degree so that the processing parameters need not be adapted at all or only to a minor degree. The attainable strength values of the plastic bottles which have been produced in the two-station stretch blow-molding method are only insignificantly influenced by adding fillers in the indicated amounts.

For producing opaque plastic bottles, 0.1% to 4% of a dye based on titanium oxide and/or zinc oxide can be added to the plastic formulation.

An exemplary HDPE which is used in the plastic formulation as disclosed herein comprises a bimodal or multimodal HDPE with a first melt index of, for example, 190° C./2.16 kg of 0.1 g/10 min to 0.9 g/10 min. Furthermore a second melt index 190° C./21.6 kg from 5 g/10 min to 50 g/10 min measured according to ISO 1133 is considered characteristic. Preferably the plastic formulation has an exemplary first melt index of 190° C./2.16 kg of roughly 0.3 g/10 min and a second exemplary melt index of 190° C./21.6 kg of 30 g/10 min and a bimodal distribution.

An exemplary plastic matrix which is based on HDPE can be optimized on the one hand for the injection molding process (or for a flow molding process) and on the other hand can be also well suited to the stretch blow-molding process. Here, in the injection molding process, the viscosity of the exemplary HDPE with a low molecular weight provides for melt ruptures being prevented. The HDPE with a greater molecular weight is essentially responsible for sufficient stretch compaction of the plastic being achieved in the stretch blow-molding process. The shrinkage values which can be achieved with the plastic formulation based on multimodal HDPE correspond largely to those of PET shortly after injection molding. This makes it possible to use injection molding molds from PET processing in the injection molding process. The analogous applies to the stretch blow-molding process, where the existing blow molds for PET processing can likewise continue to be used. Thus, switching of the raw material from PET to a plastic formulation based on HDPE does not necessarily result in tool investments.

In an exemplary method as disclosed herein for producing a plastic bottle in a two-station stretch blow-molding process, first of all in an injection molding process or in a flow molding process a preform is produced from the plastic formulation and from it a plastic bottle is produced in a stretch blow-molding process in a second process step which is separate in time and/or space. In doing so the preform is axially and radially stretched. In the method as disclosed herein, the plastic formulation which is based on, for example, at least 60% HDPE of a density from 0.941 $g/cm^3$ to 0.965 $g/cm^3$ and an exemplary melt index 190° C./2.16 kg of 0.1 to 0.9 g/10 min according to ISO 1133 is processed.

Other exemplary versions of the method call for the plastic formulations which have been modified according to the above described developments to be used.

The use of the HDPE plastic formulations as disclosed herein makes it possible to carry out a "normal" two-station stretch blow-molding process in which the preform produced from the raw material is axially stretched and radially stretched to a sufficient degree in order to impart the specified strength values to the plastic bottle which has been produced.

In order to avoid unduly high injection pressures and long residence times of the plastic formulation in the injection molding tool in the production of the preform, the preform can be produced with an injection point which has a diameter from, for example, 2 mm to 5 mm. Exemplary injection pressures in the hot channel are between 200 bar and 2000 bar.

In one process version the preform is produced with an exemplary average wall thickness from 2.1 mm to 2.9 mm. At these wall thicknesses the preform can be brought to the specified processing temperature rather quickly and uniformly in the stretch blow-molding process and the desired high processing speeds can be achieved without adverse effects on quality with respect to dimensional stability or strengths.

One version of the disclosure calls for the preform to be heated to an exemplary temperature of 115° C. to 135° C. for processing in the stretch blow-molding process. For example, the low temperatures are inherently atypical for HDPE. The special HDPE plastic formulation however allows these temperature ranges in which the flow behavior of the HDPE is especially regular, and accordingly even more complexly shaped plastic containers can be inflated in the desired quality. Here it is feasible if the preform is heated to a processing temperature of, for example, roughly (e.g., ±10%) 125° C. for further processing in the blow mold. This takes place for example by infrared radiation.

So that the manufactured plastic bottle reaches top load values as high as possible, one process version calls for the preform in the stretch blow-molding process to be axially stretched in a longitudinal stretching ratio from, for example, 1.8 to 3.2 and thus acquire high strength.

Without stretch compaction, less stretched regions of the bottles would have very thick walls and those regions of the bottle which are very dramatically stretched would have very thin walls. Stretch compaction of the selected HDPEs makes it possible to largely reduce this effect and to draw material from the thick sites of the bottle into the corners and edges. Oval HDPE bottles with a width to depth ratio from, for example, 1 to 3 thus become possible; this enables production of distinctly more oval bottles, for example in plastic bottles for cosmetic applications or for detergents.

The axial stretching rate is chosen to be, for example, 0.8 m/s to 2 m/s in order on the one hand to achieve cycle times as short as possible for the production process and on the other hand to ensure that the stretching rod does not axially penetrate the preform which has been heated to the processing temperature.

So that the manufactured plastic bottle also has sufficient strength in the circumferential direction, in one version of the disclosure an effort is made to radially stretch the preform in the stretch blow-molding process in a diameter stretching ratio from, for example, 2.4 to 3.6.

The actual blow-molding process in the stretch blow-molding process can advantageously take place with exemplary preblowing pressures of 1 bar-5 bar and with exemplary main blowing pressures from 5 bar to 15 bar. This can allow fast production cycles with simultaneously careful treatment of the raw material.

The preform in the stretch blow-molding process is inflated and axially stretched such that an inflated round bottle has a fluctuation of its wall thickness which is less than, for example, ±0.5 mm. With these small fluctuation widths the wall thickness of the plastic bottles can be further optimized without falling below the allowable minimum wall thicknesses which are involved for the specified axial and radial strengths of the HDPE bottles. Reduced raw material use means less petroleum consumption and conservation of resources as well as a reduction of $CO_2$ release. All this makes the use of the HDPE plastic formulation as disclosed herein and the two-station stretch blow-molding process which has been optimized for this purpose desirable both from an economic and also ecological standpoint.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for producing a plastic bottle in a two-station stretch blow-molding process, comprising:
    producing a preform from a plastic formulation in an injection molding process or in a flow molding process from a plastic formulation; and
    producing a plastic bottle separately from the preform in space and/or time, in a stretch blow-molding process, wherein the preform is axially and radially stretched, and wherein the plastic formulation is based on an at least bimodal HDPE containing at least 60% HDPE (high density polyethylene) of a density from 0.941 $g/cm^3$ to 0.965 $g/cm^3$ and with a first melt index 190° C./2.16 kg from 0.1 to 0.9 g/10 min according to ISO 1133, the HDPE comprising a monomodal or multimodal HDPE with a second melt index 190° C./21.6 kg from 5 g/10 min to 50 g/10 min according to ISO 1133.

2. Method as claimed in claim 1, comprising:
    producing the preform with an injection point which has a diameter from 2 mm to 5 mm; and
    injecting the preform with pressures between 200 bar and 2000 bar in a hot channel.

3. Method as claimed in claim 1, comprising:
    producing the preform with an average wall thickness from 2.1 mm to 2.9 mm.

4. Method as claimed in claim 1, comprising:
    heating the preform to a temperature from 115° C. to 135° C. for processing in the stretch blow-molding process.

5. Method as claimed in claim 1, comprising:
    axially stretching the preform in the stretch blow-molding process in a longitudinal stretching ratio from 1.8 to 3.2.

6. Method as claimed in claim 5, wherein an axial stretching rate is 0.8 m/s to 2 m/s.

7. Method as claimed in claim 1, comprising:
    radially stretching the preform in the stretch blow-molding process in a diameter stretching ratio from 2.4 to 3.6.

8. Method as claimed in claim 2, comprising:
    inflating, and axially stretching, the preform in the stretch blow-molding process such that an inflated bottle, in areas between corners and edges, has a fluctuation of its wall thickness which is smaller than +0.5 mm.

9. Method as claimed in claim 8, comprising:
    producing the preform with an average wall thickness from 2.1 mm to 2.9 mm.

10. Method as claimed in claim 9, comprising:
    heating the preform is heated to a temperature from 115° C. to 135° C. for processing in the stretch blow-molding process.

11. Method as claimed in claim 10, comprising:
    axially stretching the preform in the stretch blow-molding process in a longitudinal stretching ratio from 1.8 to 3.2.

12. Method as claimed in claim 11, comprising:
radially stretching the preform in the stretch blow-molding process in a diameter stretching ratio from 2.4 to 3.6.

* * * * *